United States Patent
Koral et al.

(10) Patent No.: US 12,425,850 B2
(45) Date of Patent: Sep. 23, 2025

(54) TELECOMMUNCATION NETWORK VERIFICATION FOR TWO-FACTOR AUTHENTICATION

(71) Applicant: AT&T Intellectual Property I, L.P., Atlanta, GA (US)

(72) Inventors: Yaron Koral, Cherry Hill, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 426 days.

(21) Appl. No.: 17/951,388

(22) Filed: Sep. 23, 2022

(65) Prior Publication Data

US 2024/0107301 A1    Mar. 28, 2024

(51) Int. Cl.
*H04W 12/06* (2021.01)
*H04W 12/63* (2021.01)

(52) U.S. Cl.
CPC .......... *H04W 12/06* (2013.01); *H04W 12/63* (2021.01)

(58) Field of Classification Search
CPC ..... H04W 12/06; H04W 4/80; H04W 12/069; H04W 12/08; H04W 12/04; H04W 12/10; H04W 12/02; H04W 12/106; H04W 12/50; H04W 12/03; H04W 12/12; H04W 12/72; H04W 12/126; H04W 12/062; H04W 12/30; H04W 12/37; H04W 12/40; H04W 12/128; H04W 12/104; H04W 12/043; H04W 12/48; H04W 12/102
See application file for complete search history.

(56) References Cited

U.S. PATENT DOCUMENTS

| 8,295,898 | B2 | 10/2012 | Ashfield et al. |
| 8,312,157 | B2 * | 11/2012 | Jakobsson ........... H04L 63/0892 709/217 |
| 8,892,461 | B2 * | 11/2014 | Lau .................... G06Q 30/0269 705/14.66 |
| 10,178,223 | B1 | 1/2019 | Marimuthu |
| 2015/0269577 | A1 * | 9/2015 | Avegliano .......... G06Q 20/4016 705/44 |

(Continued)

OTHER PUBLICATIONS

TechTarget, "5 Common Authentication Factors to Know", accessed from https://www.techtarget.com/searchsecurity/feature/5-common-authentication-factors-to-know on Jan. 6, 2023, 6 pages.

*Primary Examiner* — Kwasi Karikari

(57) ABSTRACT

A processing system may obtain a first network event data set associated with a telephone number, where the first network event data set includes identifier matching data associated with the telephone number. The processing system may next apply an input data set comprising at least the first network event data set to a machine learning model implemented by the processing system to obtain an authenticity score associated with the telephone number, where the machine learning model is configured to generate the authenticity score associated with the telephone number in accordance with the input data set. The processing system may next obtain a request from a first authentication service for the authenticity score associated with the telephone number and may transmit the authenticity score associated with the telephone number to the first authentication service in response to the request.

20 Claims, 3 Drawing Sheets

(56) References Cited

U.S. PATENT DOCUMENTS

2020/0042723 A1\* 2/2020 Krishnamoorthy ..... G06F 21/45
2020/0402054 A1\* 12/2020 Manjunath ......... G06Q 20/3674
2022/0400384 A1 12/2022 Byrne \* cited by examiner

TELECOMMUNCATION NETWORK VERIFICATION FOR TWO-FACTOR AUTHENTICATION

The present disclosure relates generally to two-factor authentication and securing of network-based communications, and more particularly to methods, computer-readable media, and apparatuses for providing to an authentication service an authenticity score that is obtained via a machine learning model in accordance with inputs comprising a network event data set associated with a telephone number.

BACKGROUND

Increasingly, access to online accounts with sensitive information may require an additional form of authentication besides a password. For instance, this may involve an additional input from a mobile device, e.g., two-factor authentication (2FA). However, if the mobile device falls into the hands of an attacker, it may be possible for the attacker to override this second verification mechanism.

SUMMARY

In one example, the present disclosure describes a method, computer-readable medium, and apparatus for providing to an authentication service an authenticity score that is obtained via a machine learning model in accordance with inputs comprising a network event data set associated with a telephone number. For example, a processing system including at least one processor deployed in a telecommunication network may obtain a first network event data set associated with a telephone number, where the first network event data set includes identifier matching data associated with the telephone number. The processing system may next apply an input data set comprising at least the first network event data set to a machine learning model implemented by the processing system to obtain an authenticity score associated with the telephone number, where the machine learning model is configured to generate the authenticity score associated with the telephone number in accordance with the input data set. The processing system may next obtain a request from a first authentication service for the authenticity score associated with the telephone number and may transmit the authenticity score associated with the telephone number to the first authentication service in response to the request.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
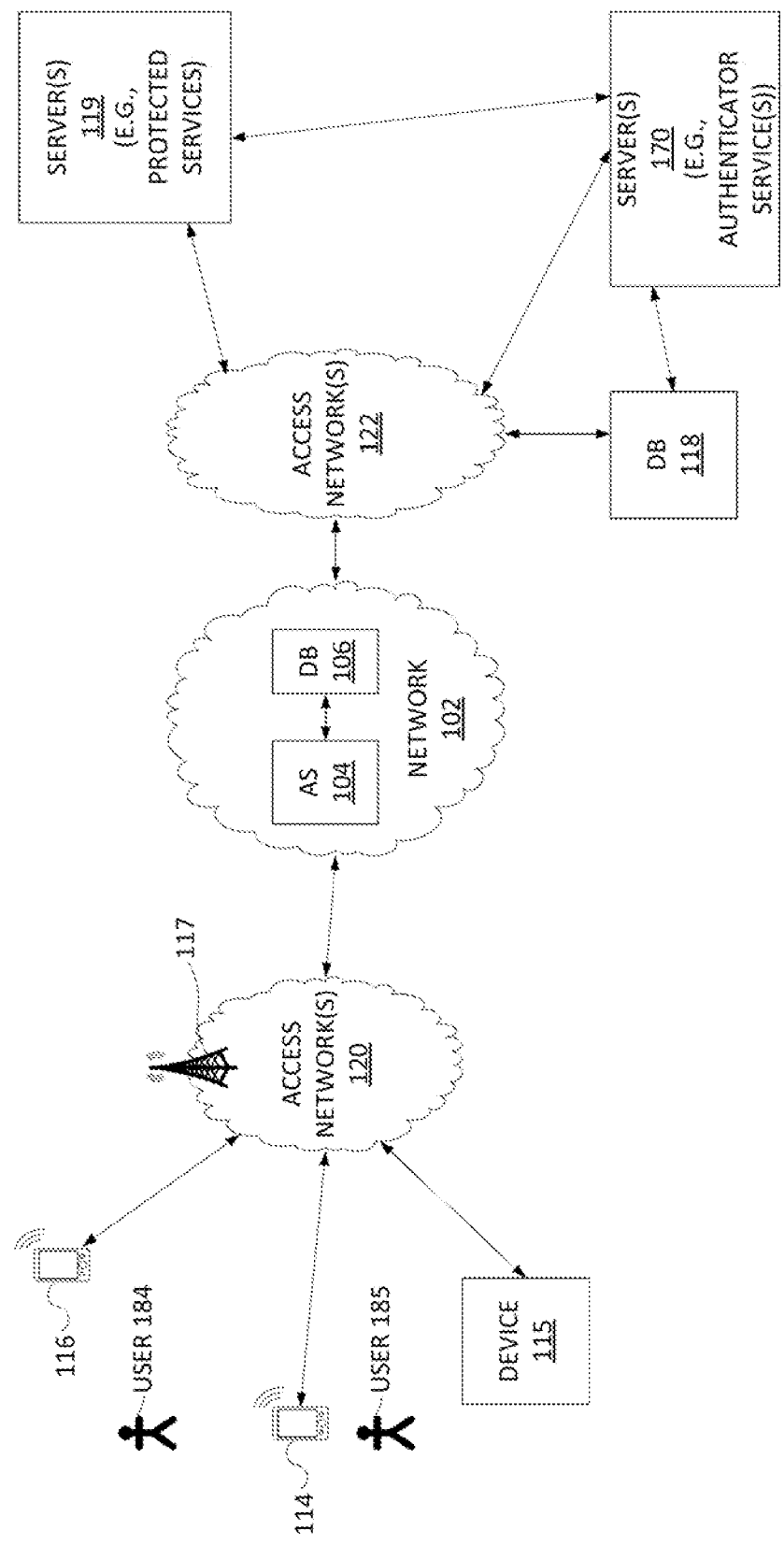
FIG. 1 illustrates an example network related to the present disclosure.

Examples of the present disclosure describes methods, computer-readable media, and apparatuses for providing to an authentication service an authenticity score that is obtained via a machine learning model in accordance with inputs comprising a network event data set associated with a telephone number. Notably, access to online accounts with sensitive information may require an additional form of authentication besides a password. For instance, this may involve an additional input from a mobile device, e.g., two-factor authentication (2FA). However, if the mobile device falls into the hands of an attacker, it may be possible for the attacker to override this second verification mechanism.

Examples of the present disclosure provide an additional measure of security in connection with secondary identity verification, or secondary authentication (e.g., two-factor authentication). In particular, examples of the present disclosure generate and provide an authenticity score indicative of whether a mobile device is in possession of an authorized user. For instance, the score may be calculated by observing the mobile device's network parameters and determining any deviation from standard patterns. Abnormalities may result in a low authenticity score for the device, which may be indicative of a greater likelihood that a device was hijacked. In one example, the present disclosure may include an application programming interface (API) to provide authenticity scores to authenticator services. In accordance with the present disclosure, the authenticator services may include first parties that may provide or require two-factor authentication for access to online services, e.g., banks, cryptographic wallet providers, cryptocurrency exchange platforms. credit card providers, gaming platforms, video or audio streaming services, cloud storage or cloud computing services, social media services, online account services for utilities, retailers, or the like, medical institutions providing access to patient records, and so forth. In addition, authenticator services may include third-party authenticator services that may provide secondary authentication of users on behalf of various entities, such as Duo Mobile™, Microsoft Authenticator™, Authy™, Google Authenticator™, and so forth. In any case, these authenticators can block authentication attempts, or provide additional remedial actions in response to authenticity scores provided in accordance with the present disclosure.

Examples of the present disclosure address the problem of how an authenticator can trust any authentication coming from a mobile device. For instance, two-factor authentication may rely on input from a user's cellular device, such as the input of a code received via text message, e.g., short message service (SMS) message, or via an in-app message, and/or by pressing a button via a user interface screen presented in accordance with a client-side authenticator application (app). However, this device or its subscriber identity module (SIM) card can fall into the hands of a malicious actor. In addition, a malicious actor may engage in SIM hijacking, without necessarily having to possess the legitimate SIM card. Examples of the present disclosure thus attempt to determine whether the device is still possessed by its legitimate user (or that the telephone number is still associated with the legitimate user and the user's SIM and/or cellular device) so that the authentication can be trusted. In one example, the present disclosure exposes the information to an authenticator service that can apply a policy based on the authenticity score.

In one example, an authenticator service may send an authenticity-score request, e.g., via an API, to a telecommunication network-based processing system. The request may indicate one or more identifiers associated with a user and/or the user's device available at the point of the authentication request. In one example, the authenticator service may also include the time of a last successful authentication of the user. For example, a request may include the telephone number +1(123)456-7890 and the date Oct. 10, 2021. The processing system may then use the phone number to extract associated network event data to identify if there has been any suspicious activity since the last authentication. For example, if the telephone number has been associated with a new mobile device (e.g., a new hardware identifier) and/or a new SIM just a few minutes before the authentication request, the processing system may reply with a low score, and in one example, may also provide a reason for the low score. In one example, the score may be a numeric score on a scale (e.g., 0 to 100, 0 to 1, 1 to 100, 1 to 10, 0 to 10, 1 to 5, etc.). In another example, the score may be a binary variable (e.g., 0 or 1, "yes" or "no," "admit" or "deny," etc.). In another example, the score may take one of a number of different fixed numerical or text values, e.g., a range of discrete values (e.g., 1 to 5, [very high, high, medium, low, very low], or the like). In still another example, the authenticity score may be a binary variable with a confidence value or confidence score (e.g., "admit confidence 8/10," "deny confidence 2/10," etc.).

In one example, the same or a different API may support feedback updates from authenticator services. For example, an authenticator service may choose to provide updates to the processing system about matches or mismatches between a score that the processing system provided and the authentication outcomes. To illustrate, a past low authenticity score due to an abnormal location may turn out to be false. For instance, a customer may have been denied access to an account with an online service provider. In response, the customer may have called in to a call center and explained why the customer was authenticating from an unusual place. The call center may have manually verified the identity of the user, and thus restored access to the account. In such case, the online service provider and/or the authenticator service (which in one example may be the same entity, but in another example may be different entities) may send a feedback update to the processing system with the transaction date. For example, the feedback may include the telephone number, a transaction identifier, or other identifiers to enable location of the proper authentication transaction record, and a resolution (FALSE or TRUE). The processing system may thus store records relating to authenticity scores, e.g., network event data and scores/outcomes for calculating an accuracy of the authenticity scoring, and for retraining and/or updating the machine learning model.

In one example, the authenticity score is calculated upon request via an authenticity score calculator module. In another example, the module may calculate scores associated with various telephone numbers on an ongoing basis, and may provide scores upon request. In one example, this module may comprise a neural network or other machine learning models (MLMs), such as a support vector machine, or the like, that takes a set of network event, e.g., associated with a telephone number, and generates an authenticity score as output. The MLM may be trained based on sets of network event data, and feedback from one or more authenticator services (or "authenticators"). In other words, the network connections, weights, etc. may be updated and may evolve based on input feedback from authenticators regarding past authenticity scores.

In accordance with the present disclosure, an authenticity score may be based upon a set of analytic indicators, e.g., as inputs to a trained MLM. In one example, the MLM of the present disclosure may be expanded to include additional analytic indicators. In accordance with the present disclosure, indicators may be primarily associated with information that is gathered from network signaling events (broadly "network event data"). In one example, the present disclosure may incorporate the use of secondary indicators, such as customer/user-specific indicators, which may be combined with network event data as inputs to the MLM. For instance, the user may specify a network location that the user intends to typically authenticate from. This in combination with the actual location associated with an authentication request may thus affect the outcome, e.g., the score that is output from the MLM.

To further illustrate, a first indicator (e.g., a first type of network event data) in accordance with the present disclosure may include identifier matching data, e.g., pertaining to mismatched identifiers. For example, a telecommunication network may record any changes between the SIM card identifier (e.g., an integrated circuit card identifier (ICCID)), the registered equipment identifier (e.g., an international mobile equipment identity (IMEI)), the subscriber identifier (e.g., an international mobile subscriber identity (IMSI)), and the telephone number (e.g., a mobile station international subscriber directory number (MSISDN)). Accordingly, in one example, the present disclosure may identify if there have been any successful verifications since this date of the change. In addition, in one example, the present disclosure may account for whether changes are common for the specific user. For example, a user may switch SIM cards every day between a work phone and a personal phone. In one example, the present disclosure may learn this behavior and account for such changes as legitimate changes.

In accordance with the present disclosure, another indicator may comprise anomalous text behavior. For instance, the present disclosure may track received text messages to a telephone number from known authenticator services. Specific suspicious behavior that is looked for may involve receiving several authenticator texts from different services in a short period (e.g., within an hour, several hours, a single day, etc.). Similarly, another suspicious behavior may include receiving authentication texts close after an event of a mismatched identifier (e.g., within minutes or a few hours). For example, a few minutes after associating a particular telephone number with a new mobile device, the telephone number receives a text message from an authenticator service (or multiple text messages from multiple authenticator services).

Yet another indicator may be associated with device location data (e.g., abnormal location(s)). For instance, a drastic change of location may indicate fraud. For example, suppose a user is usually located in a particular area (i.e., a particular state or part of the country) and all of a sudden the user appears to initiate a transaction that causes an authentication request to be sent when the device associated with the telephone number is in an entirely different location. In such case, a lower authenticity score may result. In addition, an authenticator service may deny the authentication request, or cause the authentication to fail. Accordingly, in one example, a user may inform an authentication service (or an online service using a $3^{rd}$ party authentication service) of the user's intention to travel. In this case, the authenticator service and/or the online service can ignore alerts, scores, and/or authentication failures that may be based upon apparent location anomalies.

Still another indicator may be an indicator of whether a device, SIM, and/or a telephone number is associated with malware. To illustrate, in one example, a telecommunication network may monitor malicious traffic destinations and identify devices that communicate with such destinations (e.g., identified by Internet Protocol (IP) addresses and/or uniform resource locators (URLs) or the like). Such communications are indicative that a device has been compromised by malware. In such case, the result may be a lower authenticity score. In one example, a user affected by a failed secondary authentication as a result of malware infection may call a support center to understand why authentication failed, and may learn that the user's device appears to be infected and therefore not secure for authentication (e.g., not secure for access to the service being protected via such secondary authentication).

Similarly, another indicator may include an indicator of cellular device authentication problems. For instance, a cellular device may be set with an incorrect configuration that would cause it to authenticate with the wrong access-point (e.g., an incorrect access point name (APN)). This may increase a risk that the device is or will be compromised. Alternatively, or in addition, this may indicate that the device or telephone number is already compromised. For instance, in the case of a SIM swap, a malicious actor may hijack the telephone number which is now associated with a new device (and SIM), where the new device may fail to mirror specific network connection settings of the previous legitimate device. Thus, similar to the infected device/malware indicator, the mobile authentication problem indicator raises a flag and lowers the authenticity score.

Still another type of network event data/indicator may be an indicator of one or more suspected false base stations. Notably, a false base station may be able to hijack a cellular service and, in some cases, allow the attacker to impersonate the victim. In other instances, a false base station may more simply collect IMSI and other data that may then be used in SIM hijacking, and other malicious activities. A telecommunication network may be aware of such a false base station in a particular area at a particular time. In this case, users with cellular devices in the same area that are used for secondary authentications (e.g., 2FA) may receive temporarily lowered authenticity scores due to the possibility of having been compromised.

As noted above, in addition to network event data, in one example the present disclosure may also include user-specific/user-specified indicators. For instance, a customer may indicate an intention that the user's secondary authentication occurs from a particular location or a particular network slice. In one example, an authenticator service may add such user-specific indicators using an API request, such as: "register customer-specific indicators." In one example, the API may also comprise two additional message types: "update customer-specific indicators" and "remove customer-specific indicators" to support the maintenance of these indicators. Alternatively, or in addition, a user may enter one or more of such user-specific indicators with the telecommunication network directly. Accordingly, the present disclosure may monitor the user's locations, e.g., the locations of the user's device (with the specific consent and at the direction of the user) and/or the network slice(s) utilized, and may calculate the authenticity score further based on compliance with such user-specific indicator(s).

As also noted above, the present disclosure may learn from feedback, e.g., in a reinforcement learning framework, or retraining of a supervised MLM. For instance, an MLM of the present disclosure may start with default weights for all authenticity indicators (e.g., both network event data and user-specified indicators). Over time, a processing system of the present disclosure may receive feedback from one or more authenticator services regarding the quality/accuracy of authenticity scores provided for past authentication events. Based on this feedback, the present disclosure may gradually adjust the weights of each indicator. In other words, the MLM may be retrained when feedback is received, periodically, and/or when a minimum quantity of feedback is received, etc. For instance, the adjustments may rely on a reinforcement learning algorithm that increases the importance of successful indicators and reduces the weight of less successful ones. It should be noted that in one example, the learning focus is on the indicator type rather than how it matches a specific user. For instance, it may be the case that for a traveling user, an abnormal location would not be a good indicator, while abnormal location is highly predictive for the majority of customers. In one example, outlier customers with respect to one or more indicators may be tagged and handled with a separate model, or models.

It should be further noted that examples of the present disclosure may correlate information from several authenticators for a particular user. For instance, if one third-party authenticator reports that a specific user has a failed authentication (e.g., incorrect password entered and/or failed username/password combination, etc.), the present disclosure may correspondingly lower the authenticity score for all requests from other authenticator services related to the user (e.g., immediately or as soon as practicable after receipt of such information). In one example, failed authentications may comprise an additional input/predictor to the MLM component of the present disclosure. Alternatively, failed authentication(s) may comprise a factor that is used to modify the authenticity score as output via the MLM, (e.g., lowering the score by a value or amount for each failed authentication notification). In one example, the score may be lowered by different values or amounts based on the authenticator service. For instance, it may be found that failed authentications related to a banking service may be more significant than failed authentications related to a user's account with a hobby website. For example, it may be the case that users are typically more careless with remembering passwords for relatively less important accounts. Thus, it may be more common for incorrect passwords to be entered. Similarly, it may be the case that for online services that have specific password requirements, such as requiring password changes every two weeks, it is more common to have incorrect password entries (e.g., since users may continue to enter old passwords out of habit). On the other hand, if an authenticator service reports a valid authentication, it could increase the overall authenticity score for other authenticity score requests.

It is again noted that authenticators and/or services protected with secondary authentication may use input from a user's personal cellular device for secondary authentication. However, this may not adequately address the risk that the device was stolen or hijacked by an attacker. The present disclosure provides additional information based on network visibility, regarding the certainty that the device in use for secondary authentication is indeed in the possession of an authorized user at the time of authentication. A telecommunication network can provide this information via a dedicated authenticity API for access by online services that implement two-factor authentication, physical premises and/or in-person service providers (such as merchants that may choose to verify customer identity using cellular devices for secondary authentication), third-party authenticator services that may provide secondary verification of users on behalf of various entities, and so forth. Thus, the extra knowledge of device authenticity improves transaction security and simplifies authentication in a manner that may be seamlessly integrated with secondary authentication services. These and other aspects of the present disclosure are described in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include a wireless access point 117 (e.g., a cellular base station).

In one example, the access networks 120 may be in communication with various devices or computing systems/processing systems, such as devices 114-116, and so forth. Similarly, access networks 122 may be in communication with one or more devices or processing systems (e.g., computing systems), such as server(s) 170, database (DB) 118, server(s) 119, etc. Access networks 120 and 122 may transmit and receive communications between devices 114-116, server(s) 170, database (DB) 118, and/or server(s) 119, application server (AS) 104 and/or database (DB) 106, other components of network 102, devices reachable via the Internet in general, and so forth.

In one example, each of the devices 114-116 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In accordance with the present disclosure, each of the devices 114 and 115 may comprise a computing system, such as computing system 300 depicted in FIG. 3, and may be configured to perform operations or functions in connection with examples of the present disclosure for providing to an authentication service an authenticity score that is obtained via a machine learning model in accordance with inputs comprising a network event data set associated with a telephone number (such as illustrated and described in connection with the example method 200 of FIG. 2). For instance, device 114 may include an authentication application (app) associated with one or more authentication services in accordance with the present disclosure.

Server(s) 119 may host and may represent one or more protected services, such as servers for bank websites, cryptographic wallet providers, cryptocurrency exchange platforms, credit card providers, gaming platforms, video or audio streaming services, cloud storage or cloud computing services (including remote/cloud desktop services), social media services, online account services for utilities, retailers, medical institutions providing access to patient records, and so forth. For instance, server(s) 119 may comprise one or more servers (e.g., a web server). In one example, server(s) 119 may each include or may collectively include a database comprising one or more physical storage devices integrated with such a server, or servers (e.g., database server(s)), attached or coupled to the server(s), or remotely accessible to the server(s) to store various protected content, or content items, e.g., users' bank account records or other types of account records, which may include users' personal information, stored credit card information, crypto wallets, medical records, video, audio, multimedia, proprietary data sets, and so forth.

As illustrated in FIG. 1, access network(s) 122 may be in communication with one or more servers 170 and one or more databases (DB(s)) 118. In accordance with the present disclosure, each of the server(s) 170 may comprise a computing system or server, such as computing system 300 depicted in FIG. 3, and may individually or collectively be configured to perform operations or functions in connection with examples of the present disclosure for providing to an authentication service an authenticity score that is obtained via a machine learning model in accordance with inputs comprising a network event data set associated with a telephone number in accordance with the present disclosure. For instance, server(s) 170 may represent one or more authenticator services in accordance with the present disclosure.

In one example, DB(s) 118 may comprise one or more physical storage devices integrated with server(s) 170 (e.g., a database server), attached or coupled to the server(s) 170, or remotely accessible to server(s) 170 to store various types of information in accordance with the present disclosure. For example, DB(s) 118 may store various records in connection with user authentication, such as, for each user account: registered telephone numbers to be used for two-factor authentication, a last successful authentication, a last failed authentication, and/or an authentication history, which may include location information associated with requests for secondary authentication, such as a requesting device location, requesting device network information (such as IP address, carrier and/or internet service provider (ISP), etc.), outcomes of the secondary authentication(s), and so forth.

Figure 2:
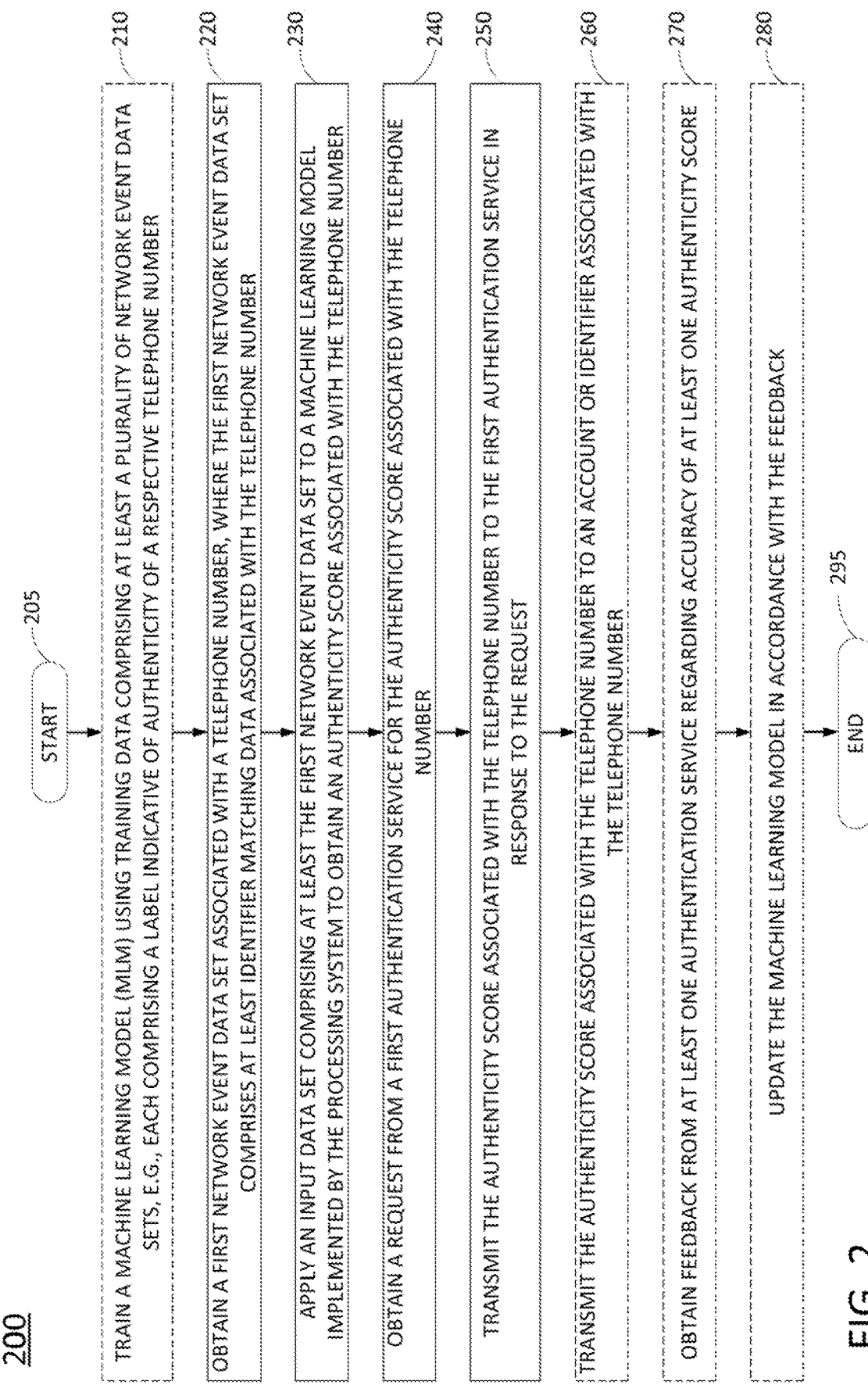
FIG. 2 illustrates a flowchart of an example method for providing to an authentication service an authenticity score that is obtained via a machine learning model in accordance with inputs comprising a network event data set associated with a telephone number.

In the example of FIG. 1, network 102 may also include an application server (AS) 104 and a database (DB) 106. In accordance with the present disclosure, AS 104 may comprise a computing system or server, such as computing system 300 depicted in FIG. 3, and may be configured to perform operations or functions for providing to an authentication service an authenticity score that is obtained via a machine learning model in accordance with inputs comprising a network event data set associated with a telephone number. For instance, a flowchart of an example method 200 for providing to an authentication service an authenticity score that is obtained via a machine learning model in accordance with inputs comprising a network event data set associated with a telephone number is illustrated in FIG. 2 and described in greater detail below. For instance, network 102 may provide a supplemental service (e.g., a scoring service) for secondary/two-factor authentications, e.g., in addition to television, phone, and/or other telecommunication services.

Figure 3:
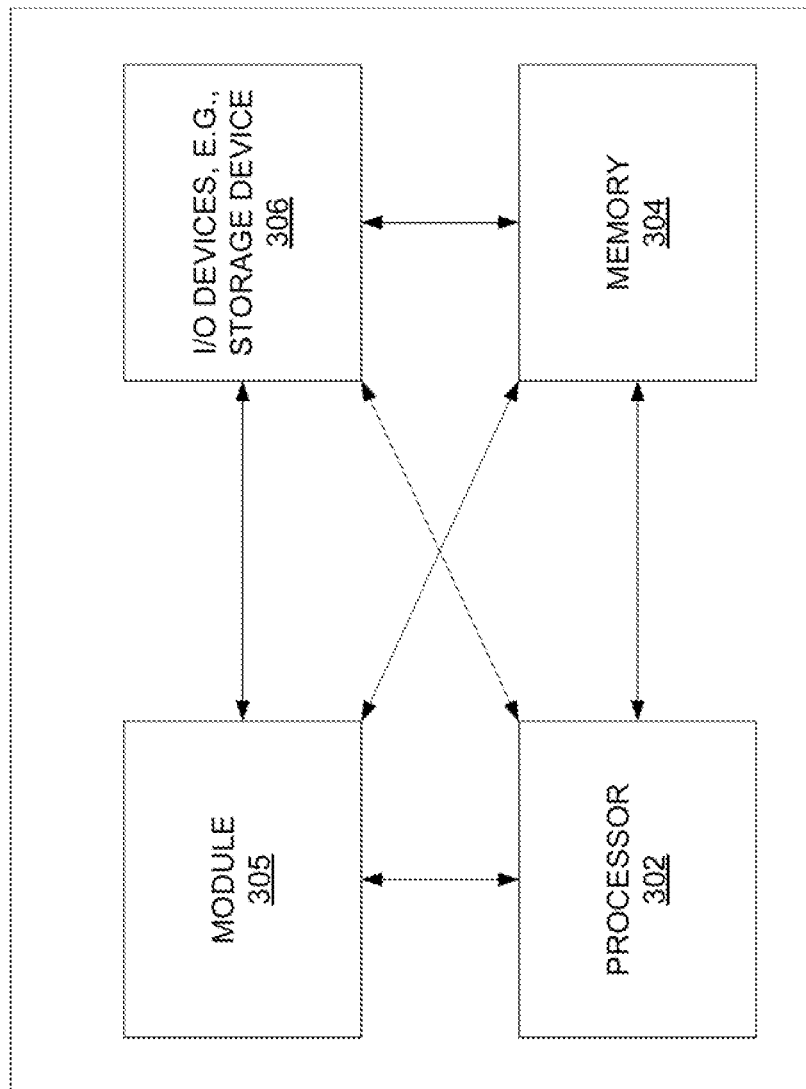
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, AS 104 may train and operate a machine learning model (MLM) that is configured to generate and output authenticity scores in accordance with network event data (and in one example further in accordance with user-specified indicators) as inputs. It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth.

Thus, in one particular example, AS 104 may train and operate an autoencoder, or encoder-decoder network, e.g., a variational autoencoder, a shallow encoder deep decoder network, etc. In another example, AS 104 may train and operate an SVM, a neural network, such as a DNN, a model that comprises an encoder for feature extraction followed by a SVM, neural network, or the like for classification, and so forth. In the case of a neural network or autoencoder, in one example, the MLM may output a score on a continuous scale. Alternatively, the MLM may be trained to select an output value from a range of discrete output values (e.g., categories). For instance, the MLM may comprise a binary or multi-class classifier. In the case of a SVM, e.g., a binary classifier, the score may be a binary output value. Alternatively, or in addition, the score may be based upon a distance of a vector representing the input features of the MLM from a separation hyperplane in a multi-dimensional feature space. In other words, the distance may represent a likelihood score of: fraud/no fraud, valid/invalid access request, etc. Examples of the present disclosure may include MLAs/MLMs that utilize supervised learning and/or reinforcement learning. It should be noted that various other types of MLAs and/or MLMs, or other generative and/or classification models may be implemented in examples of the present disclosure.

In one example, DB 106 may comprise one or more physical storage devices integrated with AS 104 (e.g., a database server), attached or coupled to AS 104, or remotely accessible to AS 104 to store various types of information in accordance with the present disclosure. For example, DB 106 may store network event data that may be used for calculating authenticity scores in accordance with the present disclosure. For instance, as noted above, network event data may include identifier matching data associated with telephone numbers (e.g., changes to associations among any two or more of: SIM card identifiers (e.g., ICCIDs), registered equipment identifiers (e.g., IMEIs), subscriber identifiers (e.g., IMSIs), or telephone numbers (e.g., MSISDNs)).

Network event data may also include: device location data, which may include at least two locations associated with the telephone number from at least two different times (e.g., a current/most recently recorded or submitted location, and a prior recorded location), access point authentication data (e.g., an indicator of whether a device has connected to an incorrect access point, or APN), and/or malware infection data associated with the telephone number and/or device (e.g., malware infection data associated with ICCID or IMEI associated with the telephone number, or any ICCID, IMEI or MSISDN associated with a subscriber ID (IMSI) associated with the telephone number, such as for an account with multiple devices and/or telephone numbers, where a compromise of any one may be a risk factor for all). Network event data may also include unauthorized base station information (which may pertain to a location associated with the telephone number) and/or a message volume associated with the telephone number for a plurality of authentication services. For instance, network 102 may have visibility into messages sent to endpoint devices from known authentication services.

In one example, DB 106 may also store data associated with one or more user-specified indicators. For instance, as noted above, a user may specify a geofence for authentication requests (e.g., permissible locations, an area, or areas where the user's device is permitted to be located for purposes of secondary/two-factor authentication, etc.), a specific network slice via which authentication requests are to be served (for instance, a user may be a first responder and may require that the device be attached to a network slice dedicated to first responder use for purposes of a valid secondary authentication), and so forth. In one example, at least a portion of the network event data and/or user-specific data may be stored in a user account record, e.g., a subscriber record, such as the associations between identifiers, the user-specific indicators (e.g., current selections of the user for user-specific indicators, if applicable), location records associated with a telephone number (e.g., MSISDN), a device (e.g., IMEI), and/or SIM (e.g., ICCID), and so forth. In one example, network event data and/or data associated with user-specified indicators may be derived from other records of network 102 that may be stored in DB 106 or elsewhere, and which may be separately retained (or not) according to various data retention policies. For instance, in one example, fine-grained device location data is not stored, but records of locations for prior secondary authentication requests may be retained separately for purposes of the present disclosure and for a longer period of time, e.g., with the user's consent and/or at the direction of the user.

Although only a single AS 104 and DB 106 are illustrated in FIG. 1, it should be noted that any number of application servers and/or databases may be deployed to perform the same or similar operations in a distributed and/or coordinated manner. Thus, AS 104 may represent multiple application servers. Alternatively, or in addition, DB 106 may represent multiple database servers. In one example, AS 104, DB 106, server(s) 170, DB(s) 118, device 114, device 115, device 116, and/or server(s) 119, may operate in a distributed and/or coordinated manner to perform various steps, functions, and/or operations described herein.

In an illustrative example, a user 185 via device 115 may seek to access a protected service that may have secondary authentication protection enabled (e.g., two factor authentication). For instance, the protected service may be hosted on, and accessible at or via one or more of server(s) 119. For instance, the user 185 may be using a home or work computer to check the user's medical records that have been uploaded to server(s) 119 (e.g., a medical provider's website). Thus, for example, the user 185 may access a webpage or use an application (app) interface to enter a username and password. The username and password may be received at server(s) 119 and verified for correctness. In one example, the user 185 may also be presented with one or more challenge questions, such as first school, father's middle name, favorite car, etc. For illustrative purposes, in the present example, it may be assumed that user 185 has entered the correct information. However, in one example, in the event that incorrect information is entered, the failure to provide proper access credentials may be recorded. In one example, server(s) 119 may also notify AS 104 of such failure. For instance, for each failure, or periodically and/or when a threshold number of failures across all users accessing the protected service are gathered, the server(s) 119 (e.g., the protected service) may notify AS 104. AS 104 may store such records and/or update records for telephone numbers associated with accounts exhibiting such primary authentication failures.

In accordance with the present disclosure, upon successful primary authentication, a secondary authentication (e.g., two-factor authentication) may be initiated. In the example of FIG. 1, the protected service (represented by server(s) 119) may engage a third-party authenticator service for this process. For instance, in the example of FIG. 1, one or more authenticator services may be represented by server(s) 170. Accordingly, the protected service may transmit a request to the authenticator service to engage in a secondary authentication of user 185. In one example, the secondary authentication may include a transmission of a text message (e.g., a short message service (SMS) message) to a cellular device associated with the user 185 (e.g., device 114). In another example, the secondary authentication may include a transmission of an application specific message (e.g., an over-the-top (OTT) application message). For instance, device 114 may include a dedicated authenticator application (app) for receiving such a message.

In one example, the message (text message or OTT message) may include a code that the user 185 is tasked with obtaining from the message via device 114, and which the user is instructed to enter via an interface of device 115. For instance, a user may enter a username and password via a first screen of a user interface presented via device 115. Upon successful primary authentication, a second screen may be presented for entry of a secondary authentication code (e.g., two-factor authentication code) that is transmitted to and presented via device 114. In another example, an OTT application message may cause an associated app on device 114 to present an interface with selectable buttons, or the like from which user 185 may select "yes" or "no," etc. to indicate that the user 185 is attempting to access the protected service or has authorized the access to the user's account with the protected service.

It should also be noted that in either case (text message or OTT message) the secondary authentication message may be directed to a telephone number designated by the user, e.g., in connection with the user's account with the protected service and/or the authenticator service. In one example, network 102 and one or more of the access network(s) 120 may represent a cellular network. In such case, components of network 102 (e.g., a cellular core network) and or the one or more of access network(s) 120 may identify an IMSI associated with such telephone number of user 185 and may forward the message (e.g., a text message) toward a current serving gateway (SGW) and base station of an associated device (e.g., device 114) as recorded for the IMSI. For instance, a home subscriber server (HSS), or the like may store an association between IMSI and MSISDN, and may identify where the device 114 is located. The text message may thus be forwarded to device 114 based on the association between the IMSI and telephone number (MSISDN) (e.g., by a short message service center (SMSC) server or the like retrieving the destination information from the HSS). Similarly, a packet data network gateway (PDN-GW or PGW) associated with an IP address assigned to device 114 may receive an over-the-top (OTT) message for device 114, and may forward the message to device 114 via a packet data protocol (PDP) context for the device 114 (e.g., including at least the SGW and serving base station (such as wireless access point 117 in access network(s) 120)).

The foregoing describes secondary authentication processes where device 114 and the associated telephone number is/are not compromised. However, it is possible that device 114 is lost and/or stolen. In addition, device 114 and or the SIM thereof may be subject to SIM hijacking, SIM swapping, IMSI and IMEI harvesting (such as via false base stations), and other attacks. To further mitigate and to prevent the effects of these attacks (such as unauthorized access to bank accounts, medical records, or other personal information, such as contact lists, shared media, messages, etc., proprietary data, and so forth), network 102 may, as noted above, provide a supplemental service for secondary/two-factor authentications, e.g., in addition to television, phone, and/or other telecommunication services. In particular, for a secondary authentication for user 185 attempting to access a protected service via device 115, the authenticator service (e.g., represented by one or more of server(s) 170) may request an authenticity score from AS 104 with respect to the telephone number of user 185. In this regard, AS 104 may calculate an authenticity score via a machine learning model in accordance with inputs comprising at least a network event data set associated with the telephone number, and may provide the score to the authentication service (e.g., in accordance with the example method 200 of FIG. 2 and/or as described elsewhere herein).

In one example, an attacker (e.g., user 184) may steal device 114 and may attempt to log-in to the accounts of user 185, where possession of device 114 may allow user 184 to pass the secondary authentication processes of various protected services and/or authenticator services. For example, an attempted access to a protected service via device 115 may not be user 185, but may be user 184, who may possess device 114 and may be attempting to access various accounts of user 185. In such case, the network activity data stored in DB 106 and applied to the MLM by AS 104 may indicate anomalous text behavior (e.g., a high number of messages from known authenticator services or the like). In this case, the output of the MLM (e.g., the authenticity score) may be lower insofar as the anomalous text behavior may be indicative that device 114 is in possession of a malicious entity that is seeking to access accounts and causing a large number of secondary authentication texts to be generated.

Similarly, in another example, user 184 may engage in a SIM swap and/or SIM hijacking of the telephone number of user 185. For example, user 184 may impersonate user 185 during a phone call with a customer service center of the operator of network 102 and/or access network(s) 120 (e.g., a cellular carrier network). In addition, user 184 may successfully convince the network operator/carrier to cause the telephone number of user 185 previously associated with device 114 to now be associated with the SIM of device 116. In this case, if user 184 successfully navigates a primary authentication of a protected service, the secondary authentication communication directed to the associated telephone number may instead be forwarded to device 116. Thus, for example, location information associated with the telephone number may be indicative of a SIM swap or SIM hijack, e.g., where the change results in a significant and/or sudden change in location. In addition, changes in the association between telephone number, ICCID, IMEI, etc. may also be indicative of such attacks and may be recorded in the network event data stored in DB 106.

It should be noted that any one or more of these or other factors may be present in network event data associated with the telephone number. When input to the MLM of AS 104, the resultant authenticity score may thus be correspondingly lower (e.g., indicating a greater likelihood of the phone number and/or device 114 being compromised) or higher (e.g., indicating a greater likelihood that the attempted access is legitimate and initiated by the authorized user 185). In any case, AS 104 may provide the authenticity score to the authenticator service (represented by one or more of server(s) 170). In response, the authenticator service may take any number of further actions, such as to permit the access to the protected service (e.g., one or more of server(s) 119) via device 115, to deny the access, to provide a limited access, such as preventing access to certain content or features that would otherwise be available to user 185, and so forth. In one example, the authenticator service may communicate with the protected service to provide a decision or outcome of the secondary authentication, where the protected services may take any one or more actions in response. For instance, the authenticator service may pass along the score, may provide an "admit" or "deny" recommendation (or a different gradation, such as "admit with restrictions"), and so forth.

In addition, in one example, the authenticator service and/or the protected service may provide feedback to AS 104 regarding the correctness of the score. For instance, if a "positive" score is provided and access is authorized, but the authenticator service and/or the protected service receives an account recovery request from user 185 indicating that the account appears to have been hijacked, this may be provided as feedback to AS 104. Similarly, for a "negative" score that prevented access or resulted in granting of only limited access to the protected service, the authenticator service and/or the protected service may receive an inquiry from user 185, such as via a telephone call, where the user 185 verifies his or her identity with other factors, the false classification, e.g., the incorrectness of the "negative" authenticity score, may be provided as feedback to AS 104. In one example, the feedback may be used in a reinforcement learning framework to retrain and update the MLM. However, in one example, not all feedback may be used for reinforcement learning. For instance, it may be the case that a low authenticity score is predominantly the result of device 114 being detected to be infected with malware. The legitimate user 185 may be the one seeking to access the protected service, but the use of the device 114 for secondary authentication remains correctly suspect. Thus, in one example, this type of feedback may be noted, but not used to retrain the MLM. Additional steps, functions, operations, or other aspects of AS 104 or other components of system 100 are also described in greater detail below in connection with the example of FIG. 2.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos, music or other audio, or other content in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114, content source(s) 119, and server(s) 170 may be in communication with network 102 via different access networks, and so forth.

In addition, device 116 may use a different access network than device 114, such as entirely different cellular carrier networks. For instance, a malicious actor, e.g., user 184 with device 116, may be located in a different part of the same country or even a different country from the user 185 and device 114. It should also be noted that although the foregoing is described primarily in connection with a third party authenticator service, in other, further, and different examples, a protected service may implement two-factor/secondary authentication on its own, such as managing its own external short message entity (ESME) that may send SMS messages via Short Message Peer-to-Peer Protocol (SMPP). Thus, in one example, a protected service and an authenticator service may be a singular entity. It should also be noted that the foregoing describes an example in which user 185 is seeking to access a protected service using device 115, where device 114 is used for secondary authentication. However, in still another example, user 185 may seek to access the protected service using device 114, where device 114 is also used for the secondary authentication. For instance, user 185 may seek to access his or her bank account via the user's mobile device (e.g., device 114) that is also associated with the phone number for secondary authentication. Thus, these and other modifications are all contemplated within the scope of the present disclosure.

FIG. 2 illustrates a flowchart of an example method 200 for providing to an authentication service an authenticity score that is obtained via a machine learning model in accordance with inputs comprising a network event data set associated with a telephone number, in accordance with the present disclosure. In one example, the method 200 is performed by a component of the system 100 of FIG. 1, such as by application server 104 and/or any one or more components thereof (e.g., a processor, or processors, performing operations stored in and loaded from a memory), by AS 104 in conjunction with one or more other entities, such as DB 106, server(s) 170, DB(s) 118, server(s) 119, and so forth. In one example, the steps, functions, or operations of method 200 may be performed by a computing device or system 300, and/or a processing system 302 as described in connection with FIG. 3 below. For instance, the computing device 300 may represent at least a portion of a platform, a server, a system, and so forth that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and may proceed to optional step 210 or to step 220.

At optional step 210, the processing system may train a machine learning model (MLM) using training data comprising at least a plurality of network event data sets. For instance, each of the plurality of network event data sets may comprise a label indicative of authenticity of a respective telephone number. In one example, the machine learning model may be configured with a plurality of inputs/predictors and an output of an authenticity score associated with a telephone number. As noted above, the inputs/predictors may include network event data predictors (e.g., associated with the elements of the network event data sets). In one example, the inputs/predictors may further include user-specified indicators, an input/predictor indicating a number of failed authentications associated with a telephone number, and so forth. In one example, the MLM may comprise an autoencoder. In other examples, the MLM may comprise an SVM, a neural network, such as a DNN, a model that comprises an encoder for feature extraction followed by a SVM, neural network, or the like for classification, and so forth. The MLM may incorporate supervised learning or reinforcement learning. In the case of a neural network or autoencoder, in one example, the MLM may output an authenticity score on a continuous scale. Alternatively, the MLM may be trained to select an output value from a range of discrete output values (e.g., categories). For instance, the MLM may comprise a binary or multi-class classifier. In the case of a SVM, e.g., a binary classifier, the score may be a binary output value. Alternatively, or in addition, the score may be based upon a distance of a vector representing the input features of the MLM from a separation hyperplane in a multi-dimensional feature space. In other words, the distance may represent a likelihood score of: fraud/no fraud, valid/invalid access request, etc.

At step 220, the processing system obtains a first network event data set associated with a telephone number, where the first network event data set comprises at least identifier matching data associated with the telephone number. For instance, the identifier matching data associated with the telephone number may comprise data indicative of whether a change has occurred regarding at least one identifier associated with the telephone number (e.g., an MSISDN). For instance, the at least one identifier may comprise at least one of: a SIM card ID (e.g., an ICCID), a registered equipment ID (e.g., an IMEI), or a subscriber ID (e.g., an IMSI). In one example, the first network event data set may further include location information associated with the telephone number. For instance, the location information may include at least two locations associated with the telephone number from at least two different times e.g., a current/most recently recorded or submitted location, and a prior recorded location (where a large location change in a short period of time may be indicative of SIM hijacking or the like). The location information may be obtained from an HSS of the telecommunication network, for example.

In one example, the first network event data set may alternatively or additionally include access point authentication data associated with the telephone number. For instance, authentication with a rouge access point or an incorrect access point may indicate a potential compromise (and hence likely a lower score when used as an input to the MLM). In one example, the first network event data set may alternatively or additionally include malware infection data associated with the telephone number. For instance, this may include malware infection data associated with an ICCID or IMEI associated with the telephone number (e.g., an MSISDN), or any or an ICCID, IMEI, or MSISDN associated with a subscriber ID (IMSI) associated with the telephone number. In one example, the first network event data set may include a message volume associated with the telephone number for a plurality of authentication service (e.g., within a recent time period, such as 12 hours, 24 hours, 36 hours, etc.). In one example, the first network event data set may include unauthorized base station information pertaining to a location associated with the telephone number.

At step 230, the processing system applies an input data set comprising at least the first network event data set to a machine learning model implemented by the processing system to obtain an authenticity score associated with the telephone number. For instance, as noted above, the machine learning model may be configured to generate the authenticity score associated with the telephone number in accordance with the input data set. In one example, the input data set may include one or more user-specified indicators in addition to the first network event data set. For instance, the one or more user-specified indicators may include an indicator of compliance with a user-specified network slice utilization associated with the telephone number, an indicator of compliance with a user-specified geofence associated with the telephone number, and so forth. In one example, the input data set may further comprise an input for a number of failed authentications associated with the telephone number from a plurality of authentication services. For instance, this value could be zero if there is no indication, or could be one or more depending on whether a user identity has been compromised and a malicious entity is attempting to access a single account multiple times, or different accounts of a user. It should be noted that failed authentications associated with the telephone number may include failed secondary authentications. For instance, a malicious entity may obtain a stolen username and password, may crack the password, etc. but may fail to gain access to a protected service by failing the secondary authentication. In this case, an authentication service may provide notification to the processing system of such failed attempt. Alternatively, or in addition, there may be a number of failed attempts with respect to a primary authentication process (e.g., incorrect password entered) which may be notified to the processing system by an authentication service and/or a protected service. In this regard, it should be noted that the failed authentication(s) may be associated with a user account or user identity that is associated with the telephone number (e.g., where the telephone number is designated for secondary authentication associated with the user account/user identity).

At step 240, the processing system obtains a request from a first authentication service for the authenticity score associated with the telephone number. For instance, the first authentication service may be a third-party that provides secondary authentication of a user on behalf of and for the benefit of a protected service. In another example, the first authentication service and the protected service may be one and the same. In one example, the request may be submitted to the processing system after a successful primary authentication via the protected service and/or the first authentication service (e.g., entry of a correct username and password combination, or the like). In one example, the request may be sent (and received by the processing system) in parallel with the first authentication service sending a secondary authentication message addressed to the telephone number (e.g., a message with a two-factor authentication code or the like).

At step 250, the processing system transmits the authenticity score associated with the telephone number to the first authentication service in response to the request. For instance, as noted above, the authenticity score may be generated via the MLM and made available upon request. In response, the first authentication service may take any number of actions, such as forwarding the score to the protected service and/or providing a recommended decision (in an example in which these are different entities). For instance, the recommendation may be "allow," "deny," "allow with restrictions," etc. In one example, the decision may be based upon the entry of a correct secondary authentication code, a time between the sending of the code in a message addressed toward the telephone number and the entry of the correct code, and the authenticity score provided by the processing system. It should be noted that in any case, the entry of an incorrect code may still cause a failure of the secondary authentication, regardless of the score.

At optional step 260, the processing system may transmit the authenticity score associated with the telephone number to an account or identifier associated with the telephone number (and in various examples, also to the telephone number, to a secondary telephone number, etc.) (e.g., via email, text message, OTT message, etc.). For instance, the present disclosure may further provide a service for notifying users of authenticity scores. Notably, informing users of authenticity scores provides timely notice of potential (or actual) compromise of the user's device, SIM, and/or telephone number. This may supplement or front-run any notifications that the user may receive from the protected service and/or the first authentication service. Accordingly, a user may take action to secure accounts, verify that the device is in the user's possession, determine whether the device is functioning properly or is demonstrating an unusual function that may be indicative of SIM hijacking, notify the user's cellular service provider (e.g., the telecommunication network) or other entities if the device is not in the user's possession or if SIM hijacking appears to be in effect, and so forth.

At optional step 270, the processing system may obtain feedback from at least one authentication service regarding accuracy of at least one authenticity score. For example, the feedback may include the telephone number, a transaction identifier, time stamp, or another identifier to enable location of the proper authentication transaction record, and a resolution (FALSE/TRUE, or the like). The processing system may thus store records relating to authenticity scores, e.g., network event data and scores/outcomes, for calculating an accuracy of the authenticity scoring, and for retraining and/or reinforcement learning.

At optional step 280, the processing system may update the machine learning model in accordance with the feedback. For instance, the updating may comprise retraining the machine learning model, e.g., where the MLM is associated with a supervised learning framework. For example, the input data set and associated feedback may comprise an additional labeled training data example to be used for retraining. In one example, older training data may be replaced by newer training data, or may be supplemented by newer training data. In one example, the updating may comprise adjusting the network connections, weights, etc. of the MLM, e.g., in a reinforcement learning (RL) framework. For instance, an MLM with RL may attempt to minimize one or more loss functions on an ongoing basis.

Following step 250 or one of the optional steps 260-280, the method 200 proceeds to step 295 wherein the method 200 ends.

It should be noted that the method 200 may be expanded to include additional steps, or may be modified to replace steps with different steps, to combine steps, to omit steps, to perform steps in a different order, and so forth. For instance, in one example the processor may continue to repeat one or more steps of the method 200, such as steps 220-230 for various telephone numbers, steps 220-250 and/or steps 220-280 for additional requests regarding the same or different telephone numbers, and so forth. In one example, the method 200 may obtain the request for the authenticity score (e.g., step 240) prior to step 220 or step 230. For instance, the calculating of the score may be in response to the request, rather than a score that may be calculated on an ongoing basis and available to be provided upon request. In such case, in one example, the request may include a time of a last successful authentication associated with the telephone number via the first authentication service. As such, the input data set may further comprise the time of the last successful authentication associated with the telephone number via the first authentication service (where the MLM may be so configured and trained to accept such an additional input as part of the input data set). Similarly, in one example, the request may include a location associated with a request for authentication via the authentication service (e.g., an apparent location from an IP address as seen by a protected service to which the user is being authenticated and/or as visible to the first authentication service, a physical location, e.g., for two-factor authentication for an in person transaction, etc.). In such case, the input data set may further comprise a location associated with the request (and the MLM may be so configured and trained to accept such an additional input as part of the input data set). In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the examples of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for providing to an authentication service an authenticity score that is obtained via a machine learning model in accordance with inputs comprising a network event data set associated with a telephone number, and various input/output devices 306, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing to an authentication service an authenticity score that is obtained via a machine learning model in accordance with inputs comprising a network event data set associated with a telephone number (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing to an authentication service an authenticity score that is obtained via a machine learning model in accordance with inputs comprising a network event data set associated with a telephone number (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor deployed in a telecommunication network, a first network event data set associated with a telephone number, wherein the first network event data set comprises at least identifier matching data associated with the telephone number, wherein the identifier matching data associated with the telephone number comprises data indicative of whether a change has occurred regarding at least one identifier associated with the telephone number, wherein the at least one identifier comprises a subscriber identity module identifier;
    applying, by the processing system, an input data set comprising at least the first network event data set to a machine learning model implemented by the processing system to obtain an authenticity score associated with the telephone number, wherein the machine learning model is configured to generate the authenticity score associated with the telephone number in accordance with the input data set;
    obtaining, by the processing system, a request from a first authentication service for the authenticity score associated with the telephone number; and
    transmitting, by the processing system, the authenticity score associated with the telephone number to the first authentication service in response to the request.

2. The method of claim 1, further comprising:
    obtaining feedback from at least one authentication service regarding accuracy of at least one authenticity score; and
    updating the machine learning model in accordance with the feedback.

3. The method of claim 1, further comprising:
    training the machine learning model using training data comprising at least a plurality of network event data sets, wherein each of the plurality of network event data sets comprises a label indicative of authenticity of a respective telephone number.

4. The method of claim 1, wherein the request includes a location associated with a request for authentication via the first authentication service.

5. The method of claim 4, wherein the input data set further comprises the location associated with the request.

6. The method of claim 1, wherein the request includes a time of a last successful authentication associated with the telephone number via the first authentication service.

7. The method of claim 6, wherein the input data set further comprises the time of the last successful authentication associated with the telephone number via the first authentication service.

8. The method of claim 1, wherein the at least one identifier further comprises at least one of: a registered equipment identifier or a subscriber identifier.

9. The method of claim 1, wherein the first network event data set further includes location information associated with the telephone number.

10. The method of claim 9, wherein the location information includes at least two locations associated with the telephone number from at least two different times.

11. The method of claim 1, wherein the first network event data set further includes access point authentication data associated with the telephone number.

12. The method of claim 1, wherein the first network event data set further includes malware infection data associated with the telephone number.

13. The method of claim 1, wherein the first network event data set further includes a message volume associated with the telephone number for a plurality of authentication services.

14. The method of claim 1, wherein the first network event data set further includes unauthorized base station information pertaining to a location associated with the telephone number.

15. The method of claim 1, wherein the input data set further comprises one or more user-specified indicators.

16. The method of claim 15, wherein the one or more user-specified indicators include an indicator of compliance with a user-specified network slice utilization associated with the telephone number.

17. The method of claim 15, wherein the one or more user-specified indicators include an indicator of compliance with a user-specified geofence associated with the telephone number.

18. The method of claim 1, wherein the input data set further comprises an input for a number of failed authentications associated with the telephone number from a plurality of authentication services.

19. A non-transitory computer-readable medium storing instructions which, when executed by a processing system including at least one processor when deployed in a telecommunication network, cause the processing system to perform operations, the operations comprising:
    obtaining a first network event data set associated with a telephone number, wherein the first network event data set comprises at least identifier matching data associated with the telephone number, wherein the identifier matching data associated with the telephone number comprises data indicative of whether a change has occurred regarding at least one identifier associated with the telephone number, wherein the at least one identifier comprises a subscriber identity module identifier;

applying an input data set comprising at least the first network event data set to a machine learning model implemented by the processing system to obtain an authenticity score associated with the telephone number, wherein the machine learning model is configured to generate the authenticity score associated with the telephone number in accordance with the input data set;

obtaining a request from a first authentication service for the authenticity score associated with the telephone number; and transmitting the authenticity score associated with the telephone number to the first authentication service in response to the request.

20. An apparatus comprising:

a processing system including at least one processor; and a non-transitory computer-readable medium storing instructions which, when executed by the processing system when deployed in a telecommunication network, cause the processing system to perform operations, the operations comprising:

obtaining a first network event data set associated with a telephone number, wherein the first network event data set comprises at least identifier matching data associated with the telephone number, wherein the identifier matching data associated with the telephone number comprises data indicative of whether a change has occurred regarding at least one identifier associated with the telephone number, wherein the at least one identifier comprises a subscriber identity module identifier;

applying an input data set comprising at least the first network event data set to a machine learning model implemented by the processing system to obtain an authenticity score associated with the telephone number, wherein the machine learning model is configured to generate the authenticity score associated with the telephone number in accordance with the input data set;

obtaining a request from a first authentication service for the authenticity score associated with the telephone number; and transmitting the authenticity score associated with the telephone number to the first authentication service in response to the request.

* * * * *